(12) United States Patent
Bui et al.

(10) Patent No.: US 7,605,992 B2
(45) Date of Patent: Oct. 20, 2009

(54) ROBUST LPOS DETECTION WITH PREDICTOR AND BIT VERIFIER

(75) Inventors: Nhan Xuan Bui, Tucson, AZ (US); Robert Allen Hutchins, Tucson, AZ (US); Melanie Jean Sandberg, Tucson, AZ (US); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 12/020,961

(22) Filed: Jan. 28, 2008

(65) Prior Publication Data

US 2009/0190250 A1 Jul. 30, 2009

(51) Int. Cl.
*G11B 5/09* (2006.01)
(52) U.S. Cl. .......................................... 360/49; 360/53
(58) Field of Classification Search ........................ None
See application file for complete search history.

(56) References Cited

U.S. PATENT DOCUMENTS

| | | | |
|---|---|---|---|
| 5,287,478 A * | 2/1994 | Johnston et al. ............. 711/111 |
| 5,380,181 A | 1/1995 | Hiraoka et al. |
| 5,930,065 A | 7/1999 | Albrecht et al. |
| 6,239,939 B1 | 5/2001 | Bui et al. |
| 6,532,128 B1 | 3/2003 | Bui et al. |
| 6,791,781 B2 | 9/2004 | Bui et al. |
| 7,203,026 B2 | 4/2007 | Horimai |
| 7,227,724 B2 | 6/2007 | Nayak et al. |
| 7,245,450 B1 | 7/2007 | Cherubini et al. |

FOREIGN PATENT DOCUMENTS

| | | |
|---|---|---|
| JP | 362095405 A | 5/1987 |
| JP | 405159545 A | 6/1993 |
| JP | 406091486 A | 6/1993 |
| JP | 2004144667 A | 5/2004 |

\* cited by examiner

*Primary Examiner*—K. Wong
(74) *Attorney, Agent, or Firm*—Hamilton & Terrile, LLP; Stephen A. Terrile

(57) ABSTRACT

A tape drive system which includes the ability to reliably reproduce LPOS information even if both of the servo channels of the tape drive system could not detect the LPOS information due to defects. The system recognizes that an LPOS sequence is sequentially incremented by one if a tape is moving in a forward direction and decremented by one if the tape is moving in a backward direction. This sequential property of the LPOS information lends itself to LPOS prediction, where the LPOS prediction is the previous LPOS value plus one if the tape is moving forward and the previous LPOS value minus one if the tape is moving backward. Even if the LPOS words from the two servo channels are both bad, but not all of the bits in the LPOS word are bad. The system uses the remaining good bits from the two servo channels to verify all of the bits of the LPOS prediction word.

18 Claims, 5 Drawing Sheets

ROBUST LPOS DETECTION WITH PREDICTOR AND BIT VERIFIER

BACKGROUND OF THE INVENTION

1. Field of the Invention

This invention relates in general to data storage systems, and more particularly to providing linear position (LPOS) estimations.

2. Description of the Related Art

Data loss is a threat to companies of all sizes; however, often data loss is not the result of a big disaster, but rather is caused by human error, viruses, and disk malfunctions. A backup routine can provide protection against data loss of all kinds. In addition, tape technology remains an efficient and cost-effective means for performing system backup. Tape technology provides benefits over other types of backup in terms of cost and capacity for data storage.

Tapes drives make backup fast, easy, reliable and affordable. Speed is important because data is constantly growing while the time available for backup is shrinking. Known tape drives write between 1 MB per second and 30 MB per second. Thus, a 200 GB backup can be completed in less than two hours. Additionally, tape drives offer a range of media that allow back up of all the data on a small to medium-sized server. Tape backup also captures system setup information, as well as data, allowing an entire system to be restored in the event a disaster strikes. In addition, backups can be scheduled to occur automatically at a time determined to be most convenient.

One issue that relates to tape backup is due to a proliferation of formats and technologies relating to tapes. LTO Technology (Linear Tape-Open Technology) has been developed to combine the advantages of linear multi-channel bi-directional tape formats with enhancements in the areas of timing-based servo, hardware data compression, optimized track layouts, and high efficiency error correction code to maximize capacity and performance.

Known LTO tapes use a tape format that has longitudinally pre-written servo tracks. The servo tracks provide a timing-based track-following position error system. With the LTO tape format, longitudinal position (LPOS) information is encoded into a servo track of the tape media. On these tape formats, this information is encoded into a pair of five servo stripes, defined as the servo sub frame 1, by shifting the second and fourth stripes in these stripes. LPOS bit 1 or 0 is encoded in each servo frame. For example, FIG. 1, labeled Prior Art, shows an example of LPOS bit information.

With LPOS tape systems, the LPOS information is used for synchronization between a logical data position and a physical tape position. Additionally, the LPOS information is used for position control and velocity control within a tape transport system. Thus, a tape drive system is often required to detect LPOS information with robustness to avoid any misdetection error due to media defect, etc. Also, for data integrity, the tape drive system often can only write data if the LPOS information is correctly detected so that the data can be reliably recovered. If the LPOS information is not detectable, the tape drive system might not be able to lay data down onto the tape.

SUMMARY OF THE INVENTION

In accordance with the present invention, a tape drive system is set forth which include the ability to reliably reproduce LPOS information even if both of the servo channels of the tape drive system could not detect the LPOS information due to defects. The system recognizes that an LPOS sequence is sequentially incremented by one if a tape is moving in a forward direction and decremented by one if the tape is moving in a backward direction. This sequential property of the LPOS information lends itself to LPOS prediction, where the LPOS prediction is the previous LPOS value plus one if the tape is moving forward and the previous LPOS value minus one if the tape is moving backward. Even if the LPOS words from the two servo channels are both bad, but not all of the bits in the LPOS word are bad. The system uses the remaining good bits from the two servo channels to verify all of the bits of the LPOS prediction word.

More specifically, in one embodiment, the invention relates to a method for providing linear position (LPOS) predictions for a tape within a tape drive system which includes generating a first LPOS verifier comprising a plurality of first LPOS verifier bits, generating a second LPOS verifier comprising a plurality of second LPOS verifier bits, determining whether bits of the plurality of first LPOS verifier bits are bad bits, determining whether any bits within the plurality of the second LPOS verifier bits are bad bits, and determining whether bad bits of the plurality of first LPOS verifier bits are coincident with bad bits of the plurality of second LPOS verifier bits.

In another embodiment, the invention relates to a tape drive system which includes a tape head and a linear position (LPOS) detection module coupled to the tape head. The LPOS detection module provides predictions for a tape within the tape drive system. The LPOS detection system includes a first LPOS verifier module that generates the first LPOS verifier comprising a plurality of first LPOS verifier bits, a second LPOS verifier module which generates a second LPOS verifier comprising a plurality of second LPOS verifier bits, a first determining module that determines whether bits of the plurality of first LPOS verifier bits are bad bits, a second determining module that determines whether any bits within the plurality of second LPOS verifier bits are bad bits, and a coincident module that determines whether bad bits of the plurality of first LPOS verifier bits are coincident with bad bits of the plurality of second LPOS verifier bits.

In another embodiment, the invention relates to an apparatus for providing linear position (LPOS) predictions for a tape within a tape drive system. The system includes means for generating a first LPOS verifier comprising a plurality of first LPOS verifier bits, means for generating a second LPOS verifier comprising a plurality of second LPOS verifier bits, means for determining whether bits of the plurality of first LPOS verifier bits are bad bits, means for determining whether any bits within the plurality of second LPOS verifier bits are bad bits, and means for determining whether bad bits of the plurality of first LPOS verifier bits are coincident with bad bits of the plurality of second LPOS verifier bits.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
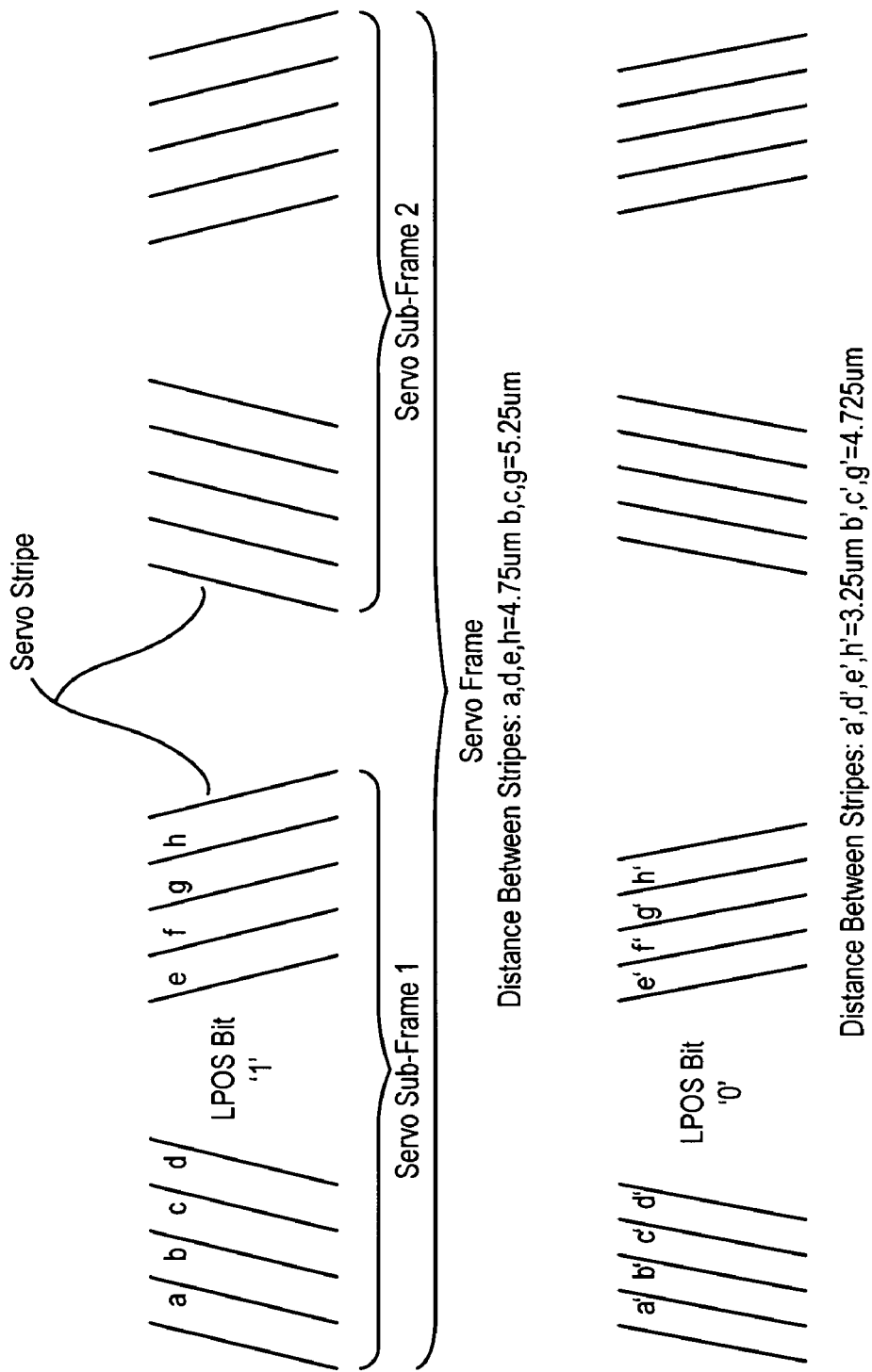
FIG. 1, labeled Prior Art, shows an example of LPOS bit information.
Figure 2:
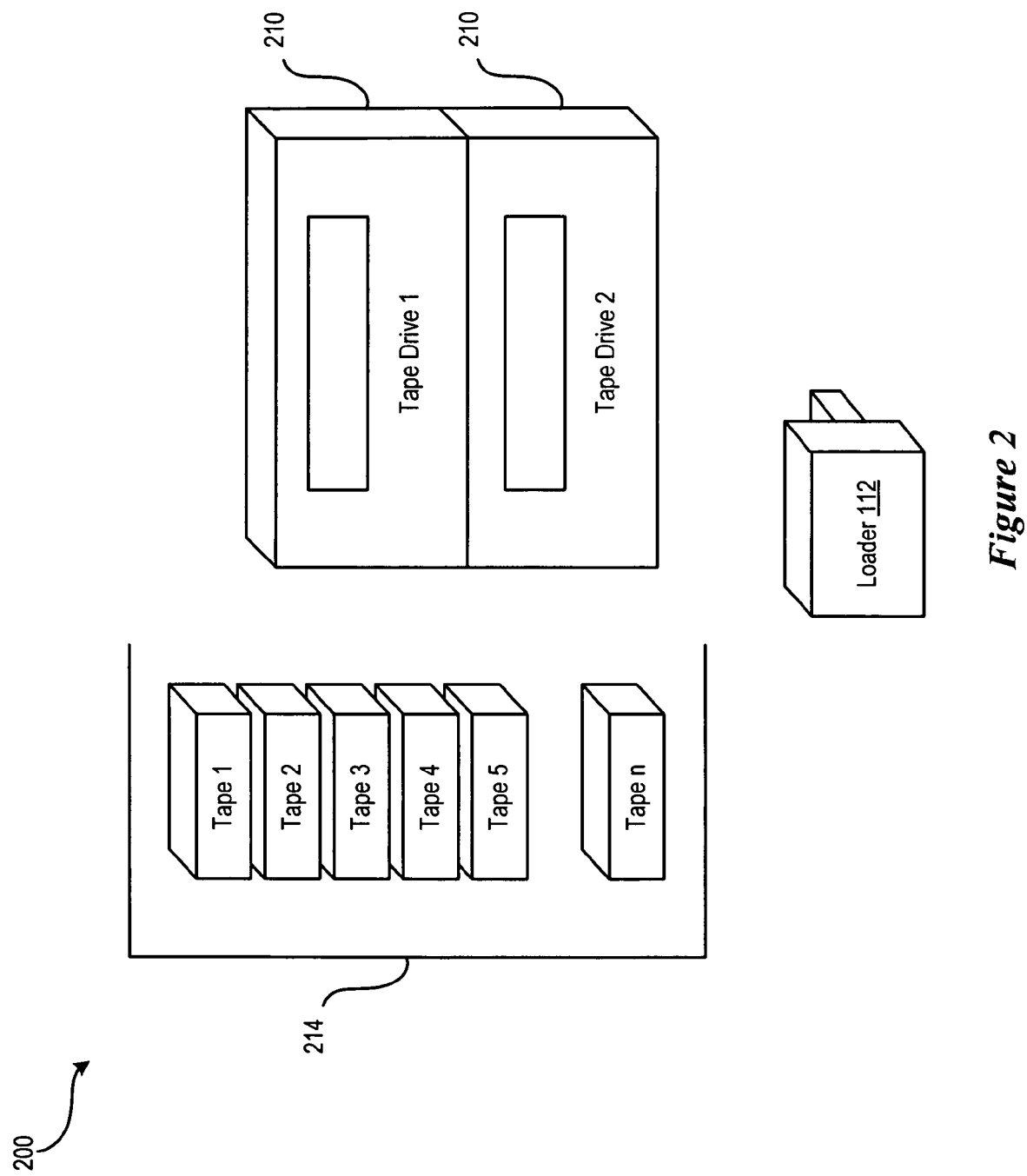
FIG. 2 shows a tape library system according to the present invention.

FIG. 2 illustrates a tape library system 200. The tape library system 200 includes at least one tape drive 210, a loader 212, and a library of tape cassettes or cartridges 214 that can be accessed by the loader 212 so as to load the tape drive 210 with an appropriately identified tape cassette or cartridge.

Figure 3:
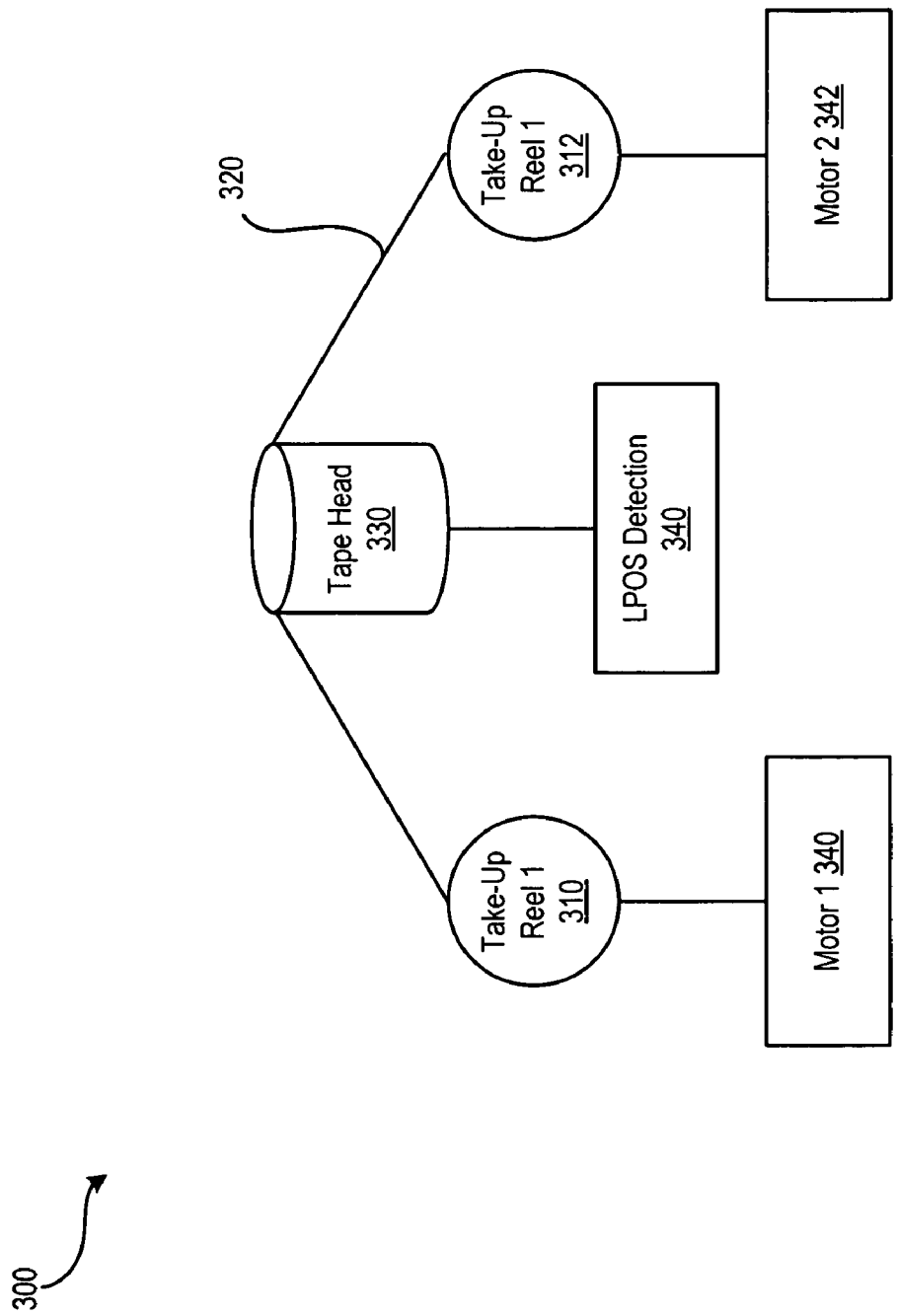
FIG. 3 shows a tape drive system according to the present invention.

FIG. 3 illustrates a tape drive system 300. A tape drive system 300 includes a tape drive 210 as well as a tape cartridge 214. The tape system 300 includes first and second take-up reels 310, 312. Magnetic recording tape 320 (from for example a tape cartridge 214) is spooled on the first and second take-up reels 310, 312. The magnetic recording tape 320 is routed over a tape read/write head 330 for reading and writing data on the magnetic recording tape 320. Take-up reel motors 340, 342 control the positioning of the magnetic recording tape 320 over the tape read/write head 330.

The tape drive system also includes a LPOS detection system 340. The LPOS detection system 340 provides the tape drive system 300 with the ability to reliably reproduce LPOS information even if both of the servo channels of the tape drive system could not detect the LPOS information due to defects. The LPOS detection system 340 recognizes that an LPOS sequence is sequentially incremented by one if a tape is moving in a forward direction and decremented by one if the tape is moving in a backward direction. This sequential property of the LPOS information lends itself to LPOS prediction, where the LPOS prediction is a previous LPOS value plus one if the tape is moving forward and the previous LPOS value minus one if the tape is moving backward. Even if the LPOS words from the two servo channels are both bad, but not all of the bits in the LPOS word are bad. The system uses the remaining good bits from the two servo channels to verify all of the bits of the LPOS prediction word.

Figure 4:
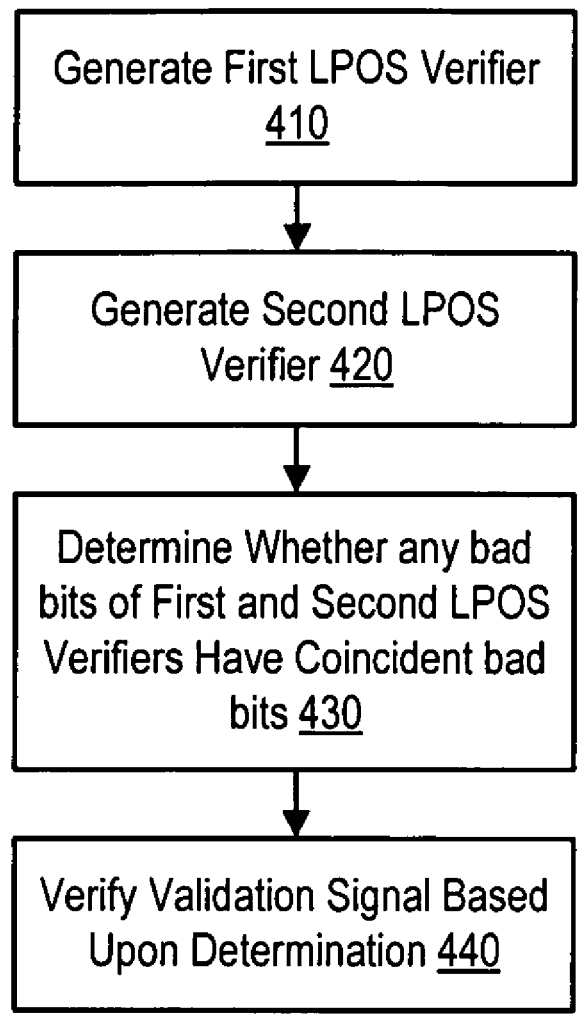
FIG. 4 shows a flow chart of the operation of a robust LPOS detection system.

Referring to FIG. 4, a flow chart of the operation of a robust LPOS detection system is shown. More specifically, the robust LPOS detection system compares a first LPOS value (LPOS1) with a predicted value at step 410. Any mismatched bits between the LPOS value and the predicted value indicate bad bits of the first LPOS value. These bits are stored within a first LPOS bad bits register. A bad bit is a bit that the detection system 340 cannot determine due to, for example, a media defect or noise.

Next, at step 420, the LPOS detection system compares a second LPOS value (LPOS2) with a predicted value. Any mismatched bits between the second LPOS value and the predicted value indicate bad bits of the second LPOS value. These bits are stored within a second LPOS bad bits register. Next, at step 430, the LPOS1 bad bits and the LPOS 2 bad bits are compared to determine whether there are any coincident bad bits. Next, a LPOS validation signal is generated at step 440. If there are any coincident bad bits, then the LPOS validation signal is set active and if there are no coincident bad bits, then the LPOS value has been verified with the good detected bits from the two servo channels.

Figure 5:
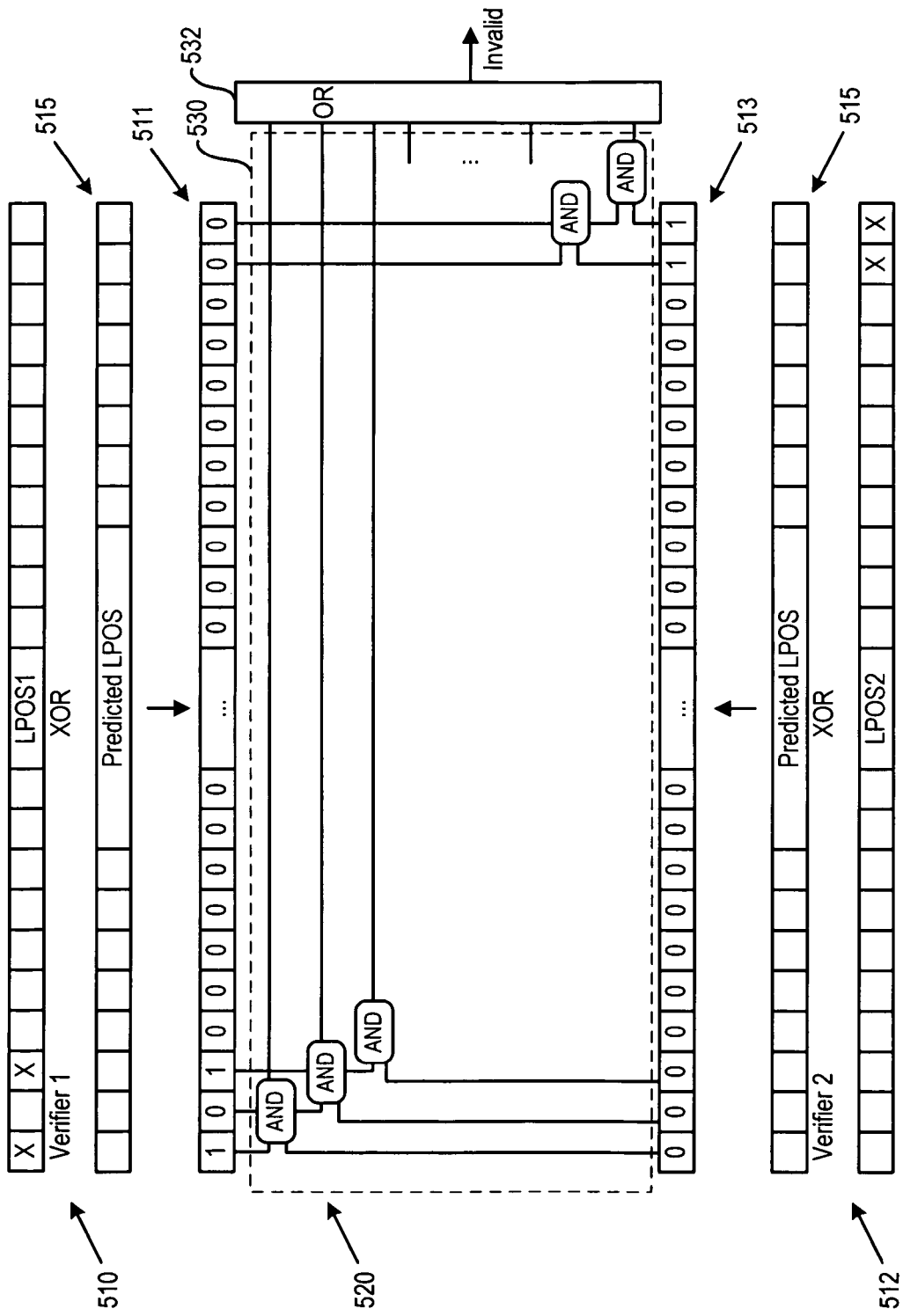
FIG. 5 shows a block diagram of a robust LPOS detection system.

FIG. 5 shows a block diagram of a robust LPOS detection system 340. More specifically, the robust LPOS detection system 340 includes a first LPOS value circuit 510, which determines whether any bits within a first LPOS detected value are bad bits, and a second LPOS value circuit 512, which determines whether any bits within a second LPOS detected value are bad bits. The robust LPOS detection system 340 also includes a coincident bad bit comparison circuit 520.

More specifically, the first LPOS value circuit 510 performs an exclusive OR operation on a first LPOS detected value and a predicted LPOS value to provide a first LPOS bad bit indication value which is stored within a first bad bit register 511. The second LPOS value circuit 510 performs an exclusive OR operation on a second LPOS detected value and a predicted LPOS value to provide a second LPOS bad bit indication value which is stored within a second bad bit register 513. In one embodiment, the predicted LPOS value (used by both the first LPOS value circuit 510 and the second LPOS value circuit 512) is stored within a predicted LPOS register 515.

The first LPOS bad bit indication value and the second LPOS bad bit indication value are provided to the bad bit comparison circuit 520 which determines whether any bad bits of the first LPOS bad bit indication value are coincident with any bad bits of the second LPOS bad bit indication value. The bad bit comparison circuit 520 compares each of the bits of the first LPOS bad bit indication value (from register 511) and the second LPOS bad bit indication value (from register 513) by ANDing each of the bits via an AND circuit 530. The results of the AND operations are then provided to an OR circuit 532, which generates the LPOS validation signal.

Accordingly, such a robust LPOS detection system advantageously corrects a plurality of bits in error as long as the bits in error are not coincident. Also, the robust LPOS detection system is fully backward compatible without requiring error correction code (ECC) functionality. Also, the robust LPOS detection system takes advantage of the sequential properties of LPOS. Also, the robust LPOS detection system provides redundancy of two independent LPOS channels. Also, the robust LPOS detection system can be used to detect LPOS synchronization indicia as the synchronization indicia is a fixed pattern that can be predicted and verified by the LPOS detection system.

Although the present invention has been described in detail, it should be understood that various changes, substitutions, and alterations can be made hereto without departing from the spirit and scope of the invention as defined by the appended claims.

What is claimed is:

1. A method for providing linear position (LPOS) predictions for a tape within a tape drive system comprising:

generating a first LPOS verifier, the first LPOS verifier comprising a plurality of first LPOS verifier bits;

generating a second LPOS verifier the second LPOS verifier comprising a plurality of second LPOS verifier bits; and determining whether bits of the plurality of first LPOS verifier bits are bad bits;

determining whether any bits within the plurality of second LPOS verifier bits are bad bits; and, determining whether bad bits of the plurality of first LPOS verifier bits are coincident with bad bits of the plurality of second LPOS verifier bits.

2. The method of claim 1 wherein:
generating the first LPOS verifier comprises using a first LPOS detected value and a predicted LPOS value to provide the first LPOS verifier; and,
generating the second LPOS verifier comprises using a second LPOS detected value and the predicted LPOS value to provide the second LPOS verifier.

3. The method of claim 2 further comprising:
exclusive ORing the first LPOS detected value and the predicted LPOS value to generate the first LPOS verifier; and,
exclusive ORing the second LPOS detected value and the predicted LPOS value to generate the second LPOS verifier.

4. The method of claim 1 further comprising:
performing a logical operation each bit of the plurality of first LPOS verifier bits with a corresponding bit of the plurality of second LPOS verifier bits to generate bit by bit logical results indicating whether bad bits of the plurality of first LPOS verifier bits are coincident with bad bits of the plurality of second LPOS verifier bits.

5. The method of claim 4 further comprising:
performing a logical operation of the bit by bit logical results to generate a validation signal, the validation signal indicating whether bad bits of the plurality of first LPOS verifier bits are coincident with bad bits of the plurality of second LPOS verifier bits.

6. The method of claim 2 wherein:
the predicted LPOS value corresponds to a current LPOS value incremented by a predetermined value when the tape is moving in a forward direction and the predicted LPOS value corresponds to a current LPOS value decremented by the predetermined value when the tape is moving in a backwards direction.

7. A tape drive system comprising:
a tape head;
a linear position (LPOS) detection module coupled to the tape head, the LPOS detection module providing predictions for a tape within the tape drive system, the LPOS detection system comprising
  a first LPOS verifier module, the first LPOS verifier module generating the first LPOS verifier comprising a plurality of first LPOS verifier bits;
  a second LPOS verifier module, the second LPOS verifier module generating a second LPOS verifier the second LPOS verifier comprising a plurality of second LPOS verifier bits; and
  a first determining module, the first determining module determining whether bits of the plurality of first LPOS verifier bits are bad bits;
  a second determining module, the second determining module determining whether any bits within the plurality of second LPOS verifier bits are bad bits; and,
  a coincident module, the coincident determining whether bad bits of the plurality of first LPOS verifier bits are coincident with bad bits of the plurality of second LPOS verifier bits.

8. The tape drive system of claim 7 wherein:
generating the first LPOS verifier comprises using a first LPOS detected value and a predicted LPOS value to provide the first LPOS verifier; and,
generating the second LPOS verifier comprises using a second LPOS detected value and the predicted LPOS value to provide the second LPOS verifier.

9. The tape drive system of claim 8 wherein:
the first verifier module comprises a first exclusive OR module, the first exclusive OR module exclusive ORing the first LPOS detected value and the predicted LPOS value to generate the first LPOS verifier; and,
the second verifier module comprises a second exclusive OR module, the second exclusive OR module exclusive ORing the second LPOS detected value and the predicted LPOS value to generate the second LPOS verifier.

10. The tape drive system of claim 7 wherein the coincident module further comprises:
a logical operation module, the logical operation module performing a logical operation each bit of the plurality of first LPOS verifier bits with a corresponding bit of the plurality of second LPOS verifier bits to generate bit by bit logical results indicating whether bad bits of the plurality of first LPOS verifier bits are coincident with bad bits of the plurality of second LPOS verifier bits.

11. The tape drive system of claim 10 wherein:
the logical operation module of coincident module performs a logical operation of the bit by bit logical results to generate a validation signal, the validation signal indicating whether bad bits of the plurality of first LPOS verifier bits are coincident with bad bits of the plurality of second LPOS verifier bits.

12. The tape drive system of claim 8 wherein:
the predicted LPOS value corresponds to a current LPOS value incremented by a predetermined value when the tape is moving in a forward direction and the predicted LPOS value corresponds to a current LPOS value decremented by the predetermined value when the tape is moving in a backwards direction.

13. An apparatus for providing linear position (LPOS) predictions for a tape within a tape drive system comprising:
means for generating a first LPOS verifier, the first LPOS verifier comprising a plurality of first LPOS verifier bits;
means for generating a second LPOS verifier the second LPOS verifier comprising a plurality of second LPOS verifier bits; and
means for determining whether bits of the plurality of first LPOS verifier bits are bad bits;
means for determining whether any bits within the plurality of second LPOS verifier bits are bad bits; and,
means for determining whether bad bits of the plurality of first LPOS verifier bits are coincident with bad bits of the plurality of second LPOS verifier bits.

14. The apparatus of claim 13 wherein:
the means for generating the first LPOS verifier comprises using a first LPOS detected value and a predicted LPOS value to provide the first LPOS verifier; and,
the means for generating the second LPOS verifier comprises using a second LPOS value and the predicted LPOS value to provide the second LPOS verifier.

15. The apparatus of claim 14 further comprising:
exclusive ORing the first LPOS detected value and the predicted LPOS value to generate the first LPOS verifier; and,
exclusive ORing the second LPOS detected value and the predicted LPOS value to generate the second LPOS verifier.

16. The apparatus of claim 13 further comprising:
means for performing a logical operation each bit of the plurality of first LPOS verifier bits with a corresponding bit of the plurality of second LPOS verifier bits to generate bit by bit logical results indicating whether bad bits of the plurality of first LPOS verifier bits are coincident with bad bits of the plurality of second LPOS verifier bits.

17. The apparatus of claim 16 further comprising:
means for performing a logical operation of the bit by bit logical results to generate a validation signal, the validation signal indicating whether bad bits of the plurality of first LPOS verifier bits are coincident with bad bits of the plurality of second LPOS verifier bits.

18. The apparatus of claim 14 wherein:
the predicted LPOS value corresponds to a current LPOS value incremented by a predetermined value when the tape is moving in a forward direction and the predicted LPOS value corresponds to a current LPOS value decremented by the predetermined value when the tape is moving in a backwards direction.

* * * * *